Dec. 10, 1940.  F. A. GARBUTT  2,224,430
APPARATUS FOR FORMING STICKS OR RIBBONS OF CHEWING GUM OR THE LIKE
Filed April 22, 1939  4 Sheets-Sheet 1

INVENTOR,
FRANK A. GARBUTT
BY
HARRIS, KIECH, FOSTER & HARRIS
FOR THE FIRM
ATTORNEYS

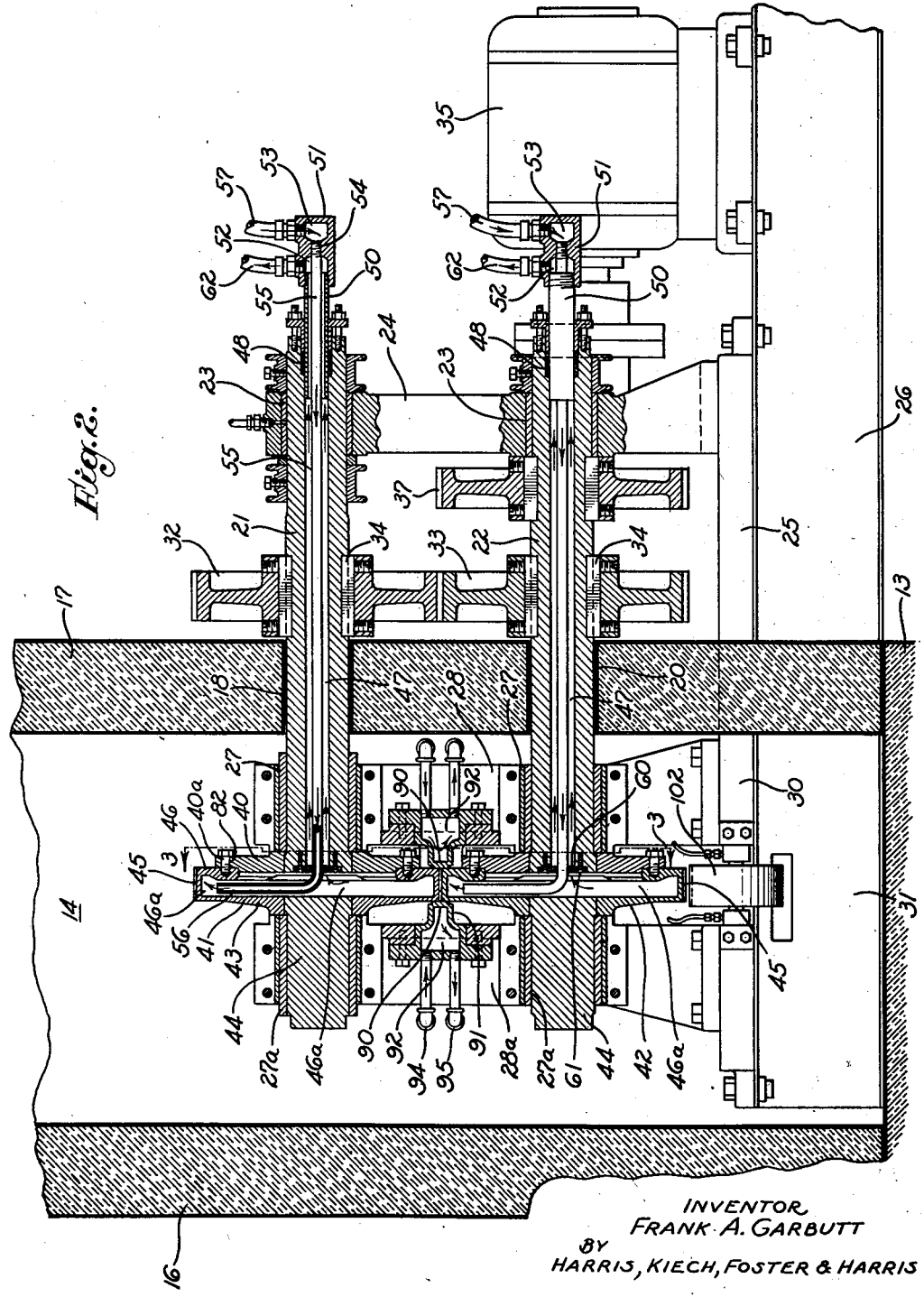

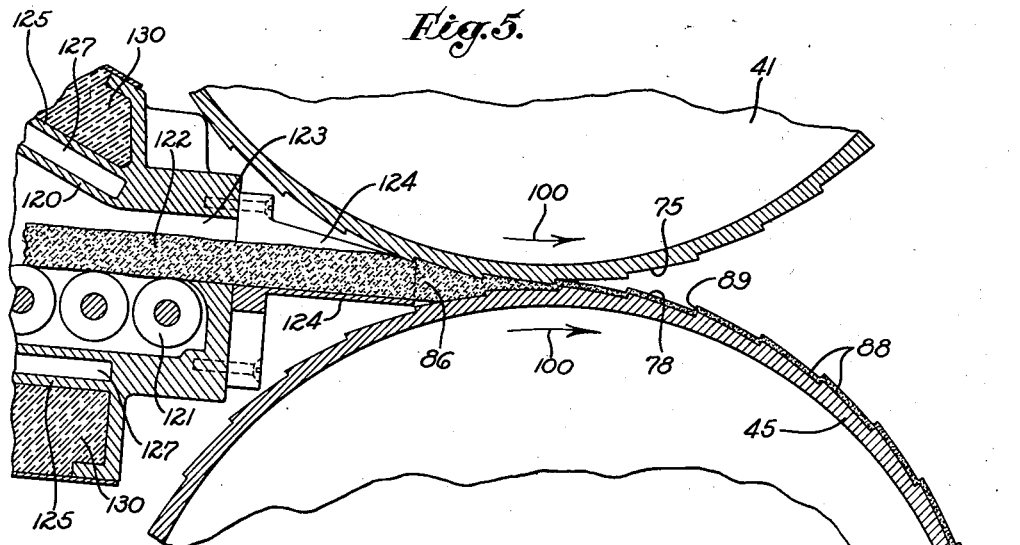
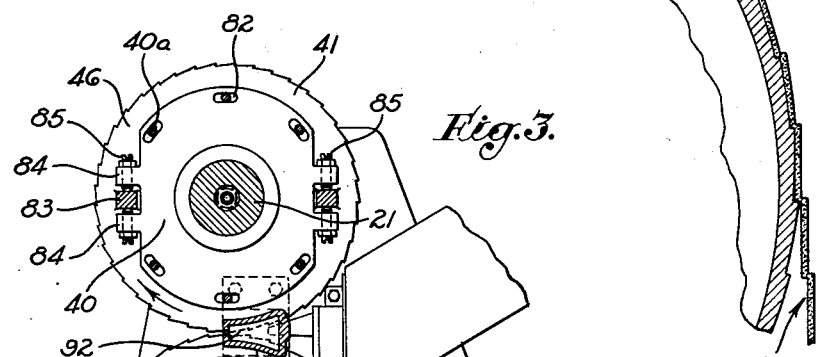
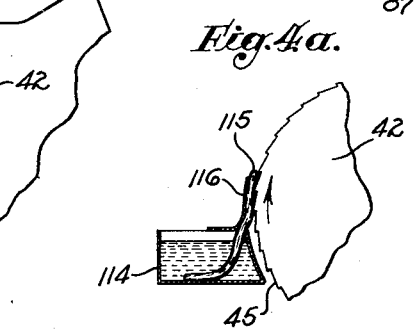
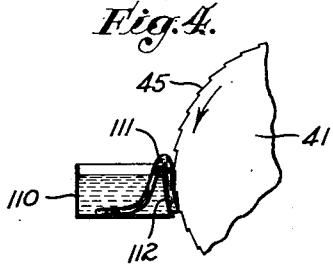
INVENTOR
FRANK A. GARBUTT
BY
HARRIS, KIECH, FOSTER & HARRIS
FOR THE FIRM
ATTORNEYS Dec. 10, 1940.  F. A. GARBUTT  2,224,430
APPARATUS FOR FORMING STICKS OR RIBBONS OF CHEWING GUM OR THE LIKE
Filed April 22, 1939  4 Sheets-Sheet 4
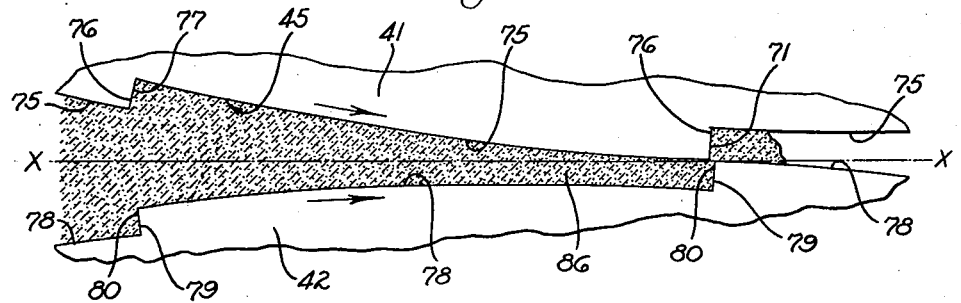
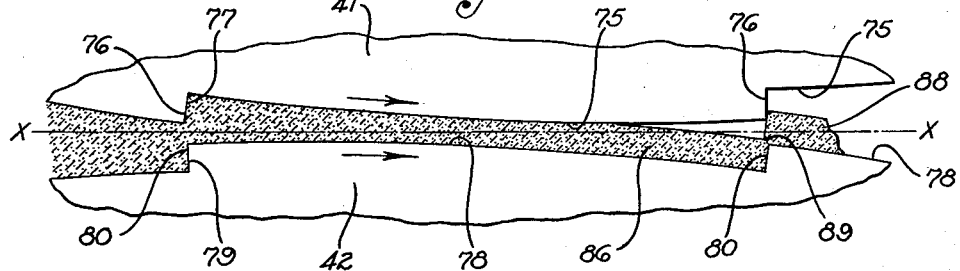
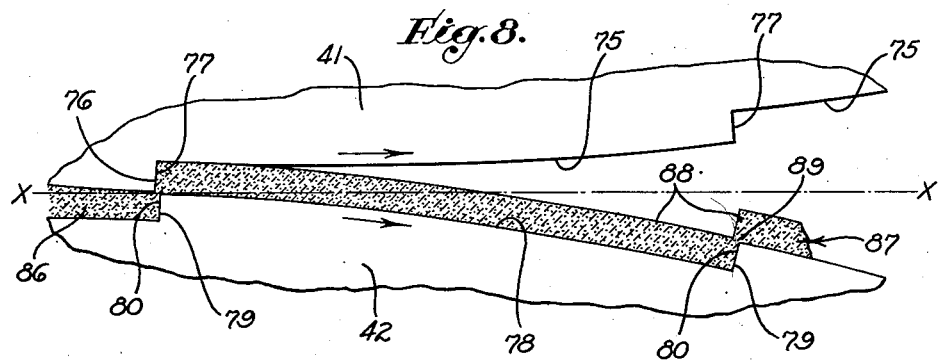
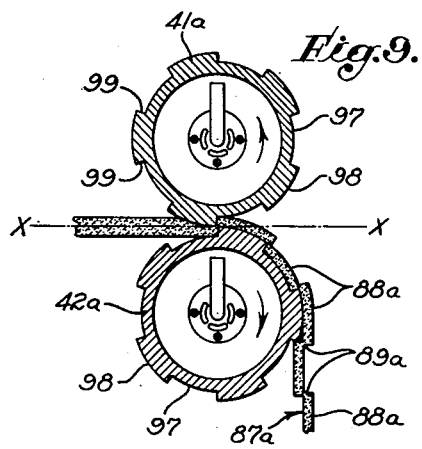
INVENTOR
FRANK A. GARBUTT
BY
HARRIS, KIECH, FOSTER & HARRIS
FOR THE FIRM
ATTORNEYS Patented Dec. 10, 1940

2,224,430

UNITED STATES PATENT OFFICE 2,224,430

APPARATUS FOR FORMING STICKS OR RIBBONS OF CHEWING GUM OR THE LIKE

Frank A. Garbutt, Los Angeles, Calif.

Application April 22, 1939, Serial No. 269,377

11 Claims. (Cl. 107—8)

The present application is a continuation-in-part of my copending application Serial No. 117,932, filed December 28, 1936, entitled "Method of forming sticks or ribbons of chewing gum or the like," which application issued as Patent No. 2,156,810 on May 2, 1939.

My invention relates to apparatus of especial utility in molding gum, especially gum of the chicle type, into desired shapes such, for instance, as sticks of chewing gum. Although the invention is capable of a relatively broad utility, its present principal use is for the manufacture of sticks of chewing gum, and accordingly it is believed that the invention may be best disclosed in conjunction with this selected use. The practice of making chewing gum is at present to roll the prepared gum into sheets of desired thickness and then to cut such sheets to stick form.

It is an object of my invention to provide a device for forming sticks of chewing gum in a cheaper and more efficient manner than is possible by use of accepted practices.

It is an object of my invention to provide a machine whereby chewing gum, heated to plastic condition, may be formed into a continuous strip consisting of consecutive sticks or wafers joined together by a thin web or wall of the gum so that such strip may be readily broken up into gum sticks of uniform size.

It is an object of my invention to provide a machine in which chewing gum of the chicle type can be formed into sticks between metal surfaces under conditions that insure the formation of perfect sticks without causing the gum to adhere to these surfaces.

The term "gum of the chicle type" is used to denote the ordinary chewing gum of commerce which is compounded from chicle or chicle substitutes and various other substances. Such gum is plastic at mouth temperatures and higher temperatures, but when in a highly plastic condition is highly adhesive, sticking to all sorts of surfaces against which it is pressed.

In the methods now used in the manufacture of chewing gum, the gum from the mixer is cooled to room temperature, and portions thereof are then rolled into sheets between rolls under light pressures, powdered sugar being employed to reduce the liability of sticking. I have discovered that chewing gum can be formed directly into any desired shape without using sugar or other dusting agent, if the gum is quite plastic and the forming surfaces are quite cold. In practice I prefer to feed the gum to the forming means at a temperature somewhat above 100° F. and to maintain the forming means at a temperature well below 32° F. and preferably considerably colder. I also perform the forming operation with sufficient rapidity to prevent the gum from hardening due to its being cooled by the cold forming means during the forming operation, and thus avoid such reduction of plasticity of the gum as would necessitate high pressures in the forming operation.

If the forming means are maintained at low temperatures in contact with the atmosphere, moisture will condense on the surfaces thereof and the fine particles of water so condensed will freeze, forming "frost" which is undesirable. It is a further object of my invention to prevent this frost formation by surrounding the forming means with dry air.

It is a further object of the invention to provide a device having means for delivering the heated gum into a zone of operation having therein a simple type of forming means which is provided with refrigerating means for keeping the surfaces of the forming means at a sufficiently low temperature to prevent sticking.

An object of the invention is to provide a device of the above character in which the forming means is comprised of walls adapted to engage the plastic gum, and to shape such gum to the desired form, such walls being refrigerated to relatively low temperature so as to prevent sticking.

A further object of the invention is to provide a device of the above character in which the forming means comprises a pair of cooperating rollers disposed so as to provide a forming space therebetween into which the plastic gum is fed, there being means for applying a refrigerant to the peripheral walls of such rollers so that such walls will be at such low temperature that sticking will be prevented.

A further object of the invention is to provide means for driving the cooperating rollers at such a speed that the formed ribbon of gum leaving these rollers is sufficiently cooled and hardened to retain its shape.

A further object of the invention is to provide a simple means for removing the formed and hardened gum from the forming means in a continuous strip and to carry the gum through a refrigerated chamber so that it is thoroughly hardened before being handled.

A further object is to provide a simple means for applying liquid to the gum forming means so that said means may be operated under adverse humidity conditions.

Further objects in mind relate specifically to the configuration of the means for molding the sticks of gum. One of these more specific objects is to provide cooperating rotary members with indented peripheral faces for forming the gum, the rotary means being adjustable with respect to their relative rotary positions whereby the configuration of the formed gum may be varied. Another of the more specific objects in the preferred form of my invention is to provide in such a device molding faces that depart from the desired configuration of the finished sticks to compensate for elastic stretch and plastic flow in the gum during the molding process.

Further objects and advantages of the invention will be made evident throughout the following part of the specification.

Referring to the drawings, which are for illustrative purposes only:

Fig. 2 is a cross-section on a plane represented by the line 2—2 of Fig. 1;

Fig. 3 is a section taken as indicated by the line 3—3 of Fig. 2, showing the means for adjusting the forming rolls;

Fig. 4 is a side elevation of one of the forming means showing in section a means for applying liquid thereto;

Fig. 4a is a similar view showing means for applying liquid to the other forming means that rotates in the opposite direction.

Fig. 5 is an enlarged fragmentary sectional view illustrating the manner in which the plastic material is formed into bodies of desired shape;

Fig. 6 is a greatly enlarged fragmentary sectional view of the forming rolls at one stage of forming a stick;

Fig. 7 is a similar view showing the rolls at a second stage;

Fig. 8 is a similar view showing the rolls at a third stage; and

Fig. 9 is a diagrammatic representation of an alternative form of forming means.

Figure 1:
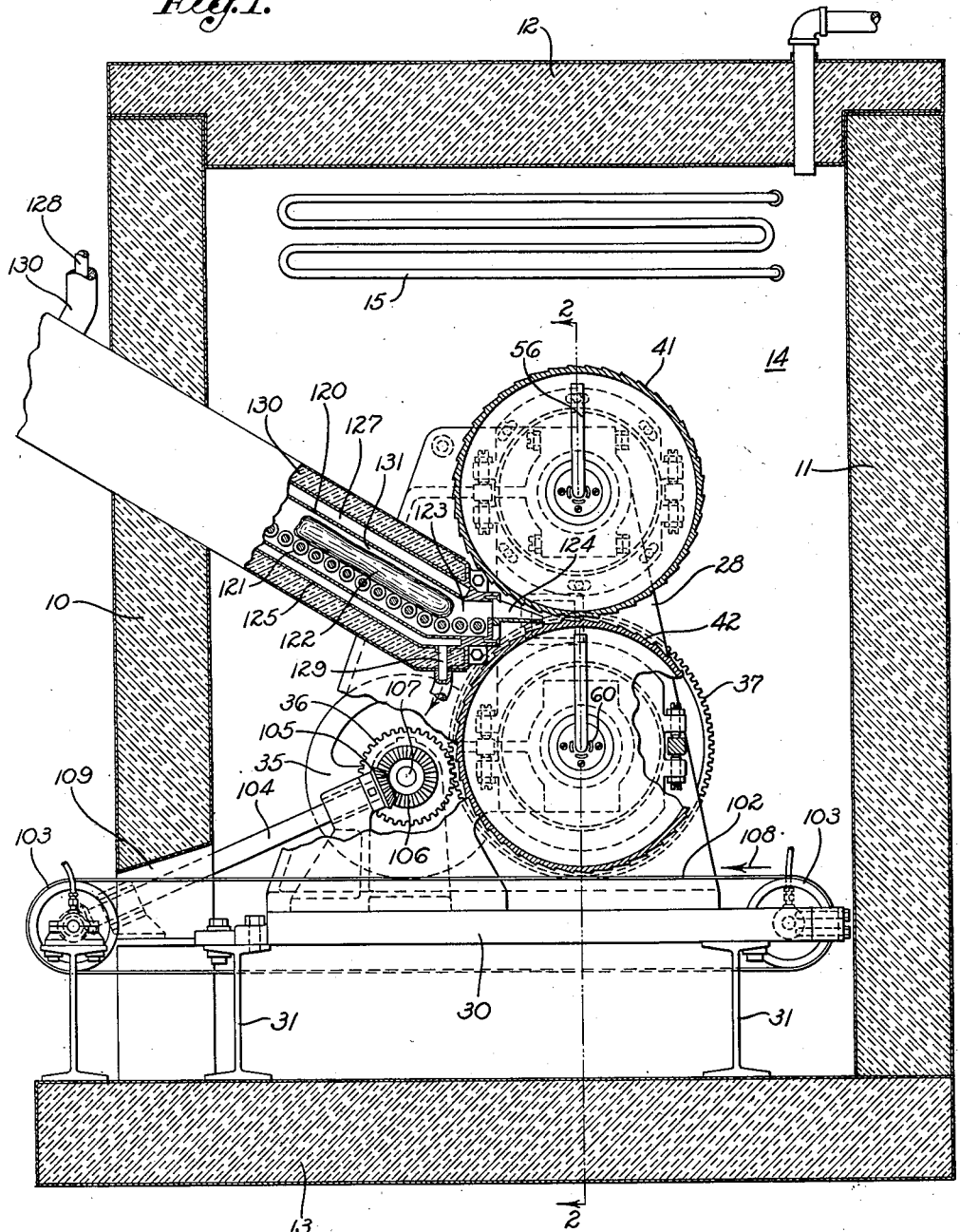
Fig. 1 is an end view partly in section of a preferred form of my invention.

In the form of the invention shown in the drawings I prefer to employ insulated walls 10, 11, 12, and 13 forming a chamber 14 adapted to be refrigerated by use of cooling coils 15. The cooling coils 15 are maintained at a temperature considerably below that of the forming means so that any moisture in the air collects and freezes thereon, thus drying the air to a point at which no moisture will condense on the forming means. The coils 15 are, of course, merely a convenient means for insuring a supply of dry air around the forming means and any other means may be used for this purpose. The coils 15 may be placed outside the chamber 14 in a separate chamber in open communication with the chamber 14, or the air may be dried by any other convenient means.

The chamber 14 has, as shown in Fig. 2, front and rear end walls 16 and 17, and the wall 17 is provided with openings 18 and 20 through which upper and lower hollow shafts 21 and 22 project. The outer ends of the shafts 21 and 22 are carried in bearings 23 which are supported by an outer bracket 24 supported on a base plate 25 which may be carried on sleepers 26 formed of I-beams. The inner ends of the shafts 21 and 22 are carried in bearings 27 supported in a bracket 28 carried by a base plate 30 which may be supported on I-beams 31. The shafts are linked together so as to rotate at the same rate of speed, but in opposite directions, by spur gears 32 and 33 which are secured respectively upon the shafts 21 and 22 by means of keys 34, and both shafts may be driven by use of an electric motor 35 so connected as to drive through a pinion 36 (Fig. 1) a spur gear 37 mounted upon the shaft 22. The leftward or inner end of each shaft 21 and 22 (Fig. 2) carries a flange or plate 40 thereon, and to these plates 40 upper and lower forming members 41 and 42 are secured by means of cap screws 40a. The forming members 41 and 42 each include a circular wall 43 mounted upon a stub shaft 44, a peripheral wall 45 extending rightwardly from the edge of the wall 43, and an annular wall 46 extending radially inwardly from the rightward end of the peripheral wall 45 to receive the cap screws 40a. The stub shafts 44 are mounted in bearings 27a carried by a bracket 28a which is also mounted upon the base plate 30.

By use of the structure above described, the forming members 41 and 42 are each provided with an interior chamber 46a, which chambers communicate with the bores 47 of the hollow shafts 21 and 22 respectively. The outer end of each shaft 21 and 22 is provided with a gland or equivalent packing device 48 into which a tube 50 extends, there being a stationary fitting 51 secured to the outer end of each tube 50. Each fitting 51 is provided with a forward chamber 52 communicating with the outer end of the tube 50 associated therewith, and an outer chamber 53 having an axial threaded opening 54 into which a delivery pipe 55 may be screwed. Each delivery pipe 55 extends through the bore 47 of a hollow shaft 21 or 22 and has the discharge end 56 thereof bent upwardly within the chamber 46a of a forming member 41 or 42. Through conduits 57 a suitable refrigerant is delivered into the chambers 53 of the fittings 51 and is conducted from the chambers 53 through the pipes 55 into the upper portions of the spaces 46a within the forming members 41 and 42. The refrigerant is discharged from the spaces 46a through openings 60 in plates 61 provided at the inner ends of the hollow shafts 21 and 22 for supporting the inner or leftward ends of the pipes 55. The discharged refrigerant passes rightwardly through the bores 47 around the pipes 55, and through the tubes 50 to the chambers 52 of the fittings 51, and is returned therefrom to the refrigerating apparatus through conduits 62 which lead outwardly from the chambers 52.

My invention is characterized by the conception that the peripheries of the rotary forming members may be indented or notched, whereby the indents or notches of the forming members will successively define stick molds. In the preferred form of my invention the notches or indents on one of the rolls or rotary forming means are adapted to form one edge and one face of each stick, the notches or indents on the other roll forming the opposite edge and opposite face of each stick.

As best shown in Figs. 6 to 8, in the preferred form of my invention the peripheral wall 45 of the upper forming member 41 is indented or notched to form a series of arcuate forming faces 75 that are more nearly tangential in disposition than radial, the faces being separated by shoulders 76 presenting forming faces 77 that are more nearly radial in disposition than tangential. Preferably the faces 77 of the upper wheels are all inclined in one direction away from true radial disposition, the faces 77 in Figs. 6 to 8 all lying in planes to the right of the axis of the upper forming member. The lower forming member 42 is indented or notched in a similar manner to provide a plurality of arcuate faces 78 that are nearer to tangential than radial in general disposition, the faces being separated by shoulders 79 that present forming faces 80 that are nearer to radial than tangential disposition. Preferably the faces 80 are in truly radial planes relative to the axis of the forming member 41. If the forming members are rotated simultaneously with the indentations of the upper forming member approximately matched with the indentations of the lower forming member, the indentations will cooperate with each other to define successive stick molds, the indentations of the upper member 41 forming one edge and one face of each stick and the indentations of the lower member 42 forming the opposite edge and opposite face of each stick.

As shown best in Fig. 3, the cap screws 40a extend through circularly elongated openings 82 in the flange plates 40 so that the walls 46 of the forming members 41 and 42 may have limited rotation relative to the plates 40, and means for rotative adjustment of the forming members are provided in the form of lugs 83 which extend outwardly from the walls 46 of the forming members 41 and 42 into spaces between approximately radial lugs 84 on the flat plates 40. Adjustment screws 85 project in tangential direction through the lugs 84 into engagement with opposite sides of the lugs 83. By use of these screws 85 the lugs 83 may be moved back and forth through limited distances and thereby rotate the forming members 41 and 42 so as to change the alignment of the forming shoulders 76 and 79 of the respective forming members 41 and 42.

The forming members are so spaced apart that a plastic material 86 fed therebetween will be shaped or formed into thin wafers between the cooperating forming arcuate walls 75 and 78.

Referring to Figs. 5 to 8, it will be recognized that if the forming member 41 were rotated by use of the adjustment means 83 in counter-clockwise direction, the shoulders 76 and 79 of the two forming means could be brought into engagement so that each wafer formed between the cooperating arcuate faces 77 and 80 would be cut off or separated from the wafers adjacent thereto. I prefer, however, to so adjust the forming members 41 and 42 that a slight space will be left between the cooperating arcuate faces 77 and 80, as heretofore described, so that each of the successive stick molds is formed in communication with the succeeding mold whereby the gum passing between the two forming members is formed into a ribbon 87 of interconnected sticks or wafers 88, each stick or wafer 88 being connected to the adjacent stick or wafer by a thin and relatively easily ruptured web 89.

On opposite sides of the plane of cooperation of the forming members 41 and 42 side wall members 90 are disposed so as to define the edges of the wafers formed between the faces 75 and 78 of the members 41 and 42. These side wall members 90 cooperate with walls 91 in forming chamber members 92 which are supported in the brackets 28 and 28a in the positions shown in Figs. 2 and 3. These chamber members 92 have inlet and discharge pipes 94 and 95 connected thereto for the circulation of a refrigerant to cool the wall members 90.

The sticks 88 interconnected in the ribbon 87 may be disposed longitudinally of the ribbon, but in the preferred form of my invention under consideration here, the sticks lie transversely, being interconnected at their longitudinal edges to form the ribbon. It will be noted that since the shoulders 76 of the upper forming member mold one longitudinal edge of each of the sticks and the shoulders 79 of the lower forming member mold the opposite longitudinal edges of the sticks, rotational adjustment of the two forming members relative to each other will not only determine the thickness of the webs 89 interconnecting the sticks in the ribbon 87, but will also determine the widths of the sticks. The dimensions, shapes, and dispositions of the various forming faces that are to come into contact with the gum in forming the sticks will be determined, first, by the desired configuration and size of the finished sticks of gum, and, second, by the physical properties of the plastic gum material.

There are two factors inherent in the character of the plastic material used for chewing gum that affect the size and configuration of the finished product when molded by a rolling action. The first factor, which may be termed "plastic flow," refers to the fact that as the spacing between the cooperating forming surfaces contracts in the rotation of the members 41 and 42, the plastic gum tends to creep or to be displaced away from the zone of restriction. Most of the time there is the same freedom for such displacement in each tangential direction from the zone of restriction. As the shoulders 76 and 79 of the two wheels approach each other in completing the formation of a gum stick, however, the shoulders tend to trap the material ahead of the restriction zone and thereby limit the freedom of the material to creep or flow in the tangential direction that is contrary to the direction of ribbon movement. This fact may be understood by inspecting Figs. 6 to 8 in which the two leftward shoulders 76 and 79 are shown approaching each other and tending to isolate more of the material than necessary in the stick currently being molded. The second factor, which may be conveniently termed "elastic stretch," refers to the fact that chewing gum generally contains rubber or rubber-like ingredients and therefore has a certain resilient resistance to deformation even when quite hot. Because of internal elastic stretch a chewing gum stick released from a mold while still plastic will immediately expand in cross-sectional dimension.

To produce a substantially flat chewing gum stick that is substantially uniformly .070 inch thick, I provide forming faces of the configurations indicated by Figs. 6 to 8 and use the following dimensions. The axial spacing between the two forming members 41 and 42 is adjusted to give a spacing of .003 inch between the shoulders 76 and 79 measured radially when the shoulders are closest together, the closest positions being shown on the right in Fig. 6 and on the left in Fig. 8. When the shoulders are in these positions of minimum clearance, the radial forming faces 77 and 80 of the shoulders are spaced apart approximately .010 inch, which spacing determines the thickness of the webs 89 interconnecting the sticks. When the leading edge of a stick is being formed, the gum is being compressed between the arcuate faces 75 and 78 of the two rotary members as indicated in Fig. 6. The extent to which the gum at the leading edge of the stick is compressed will be determined by the adjacent radial clearance .003 inch mentioned above plus the radial extent of the shoulder 79. By making the shoulders 79 with a depth of .054 inch, the faces 80 having the corresponding radial extent, I provide for compressing the leading edge of each gum stick in the molding process to a thickness of .057 inch. The central portion of each stick is compressed to minimum thickness when the cooperating faces 75 and 78 are rotated to the centralized positions indicated by Fig. 7 and the arcuate configuration given to the faces 75 and 78 is such that a metal-to-metal clearance at this juncture is .053 inch. Finally, the thickness to which the trailing edge of the stick is compressed when the rotary members reach the position of Fig. 8 is determined by the radial clearance .003 inch mentioned above plus the depth of the upper shoulder 76. The depth of the upper shoulder 76 and the corresponding radial extent of the face 77 is .056 inch so that the minimum thickness to which the trailing edge of the gum stick is temporarily compressed is .059 inch. In succession, then, the gum for the leading edge of a stick is compressed to .057 inch, the gum at the middle of the stick is compressed to .053 inch, and the gum at the trailing edge is compressed to .059 inch, but as the finished stick issues from the forming zone it expands to substantially uniform thickness of .070 inch. It may be noted in Figs. 7 and 8 that as the cooperating shoulders of the wheel approach each other and tend to trap gum in forming the trailing edge of the stick, the central zone of the stick is being released and it is to this thinnest portion central of the stick that the trapped gum tends to flow as the shoulders move to the position shown in Fig. 8. To achieve this effect, i. e., maximum compression in the middle of the sticks, one or both of the cooperating faces 75 and 78 is given a bulging configuration that results in one or both of the faces of the stick being temporarily concave. The concavity disappears in the finished stick because of plastic flow and elastic stretch. It will be readily understood by those skilled in the art that the described dimensions and proportions conform to the characteristics of a particular plastic mixture and are stated by way of illustration only. Other plastic materials would require changing the dimensions and shapes described above.

It will be noted that the shoulders 76 of the upper forming roll 41 present the radial faces 77 in the direction of rotation, whereas the shoulders 79 on the lower roll 42 present the corresponding radial faces 80 in the direction contrary to rotation. The formed ribbon of gum tends to follow the roll having the shoulders facing contrary to the direction of rotation and in the arrangement shown in the drawings this tendency together with gravity causes the ribbon 87 to follow the lower roll 42.

It will be noted that adjacent edges of the sticks in the formed ribbon are offset from each other. In Figs. 6 to 8 the line X—X represents an intermediate tangentially disposed plane through the molding zone where the forming surfaces of the two rotary members 41 and 42 cooperate. The leading edge of each stick is formed below the plane X—X and the trailing edge is formed above the plane X—X. It will be obvious to those skilled in the art that other forms of rotary members may be employed to produce a ribbon of interconnected sticks with the edges of the adjacent sticks in offset relationship. For example, the forming means may have the general form shown in Fig. 9 in which 41a and 42a are the two rotary forming means. Each of these two forming means has an inner series of arcuate forming faces 97 in alternate relationship with an outer series of arcuate forming faces 98, there being a shoulder 99 at each juncture of an inner arcuate face with an outer arcuate face. The arrangement shown in Fig. 9 forms a ribbon 87a of offset sticks 88a interconnected by temporary webs 89a in which each stick is formed entirely to one or the other side of the intermediate plane X—X. Other shapes of forming means will readily occur to those skilled in the art.

A feature of the invention is that the forming means is provided with walls subjected to a refrigerant so that they will be maintained at a low temperature sufficient to prevent the gum from sticking thereto and to cause solidification of the plastic material as the result of engagement with the forming means. The plastic material 86, that is, the warm chewing gum, may be fed into the forming means, as shown in Fig. 5, at a temperature around 160° F. At this temperature the mixture is very pliable and easily formed so that as the rotation of the members 41 and 42 in the directions indicated by the arrows 100 draws the gum into the molding zone between the members 41 and 42, the gum will readily flatten out to fill the space between the upper and lower faces 75 and 78 and the side wall members 90. The refrigerant maintains the peripheral walls 45 of the forming means and also the walls 90 at a temperature below freezing point, the result being that the heated and consequently plastic gum does not stick and is sufficiently cooled to such a condition that as the strip 87 is carried forwardly, the wafers 88 will maintain their respective forms.

Disposed below the forming member 42 is a conveyor belt 102 (Fig. 1) carried over pulleys 103, one of which is adapted to be driven through a shaft 104 and a bevel gear 105 from a bevel gear 106 mounted on a shaft 107 which carries the drive pinion 36. The upper portion of the belt 102, moving to the left as indicated by the arrow 108, carries the strip 88 through an opening 109 in the wall 10 of the chamber 14 to a suitable disposal for the strip 87. During the movement of the strip 87 by the conveyor belt 102, it is subjected to the low temperature maintained in the chamber 14 by the refrigerating coils 15, the result being that when it issues from the opening 109 of the chamber 14 it will be in thoroughly hardened and easily handled condition.

While the apparatus above described operates perfectly if the forming means are properly cooled and proper degrees of humidity and temperature are maintained in the space surrounding the forming means, it will be found that if it is difficult to maintain these conditions the operation of the process and apparatus described will be facilitated if a liquid is applied to the surfaces of the forming means. This can be conveniently done by the means shown in Figs. 4 and 4a. A small container 110 adjacent the forming roll 41 and containing a suitable liquid such as grain alcohol has a wick 111 draped over an arcuate wall 112 of the container. The wick 111 lies against the peripheral wall 45 of the forming member and slowly delivers thereto a thin film of the liquid. In like manner, as shown in Fig. 4a, a small container 114 of grain alcohol or the like has a wick 115 that extends upward between a metal tongue 116 and the peripheral surface 45 of the forming means 42. Alcohol will not solidify at the temperature maintained in the forming means and will readily evaporate from the surfaces of the subsequently formed sticks.

The invention also includes means for heating the plastic material and delivering the plastic material to the forming means at a suitable temperature. In Figs. 1 and 5, I show a passage member 120 preferably formed of metal and projecting downwardly at an angle through the insulated wall 10 of the chamber 14. This passage member 120, which is of tubular form, has rollers 121 in the lower portion thereof along which bodies 122 of the warm gum may travel toward a horizontally directed opening 123 into a feed spout 124 adapted to direct the gum into the molding zone between the upper and lower forming members 41 and 42. Surrounding the passage member 120 for feeding the hot gum to the forming means is a wall 125 forming a space or jacket 127 into which a heating fluid, such as steam, may be delivered through inlet piping 128, to be later discharged through outlet piping 129. Around the heated members of the device, for example, around the wall 125 and the piping 128 and 129, a suitable layer of insulating material 130 may be placed as indicated. The passage 131 within the member 120 is maintained at a constant temperature, and if the gum upon delivery into the upper end of the passage 131 is not sufficiently heated, its temperature will be raised to proper point as it moves downwardly along the rollers 121 to the forming means. In the ordinary practice of the invention, however, the gum is prepared and heated prior to its delivery into the passage 131 so that the function of the passage is then merely to maintain the gum at its desired temperature and direct the same into the forming or molding device.

It will be understood that the gum is delivered to the forming members 41 and 42 at a temperature at which it is thoroughly plastic; for example, 160° F., and at which it can be caused to flow into its final shape and be formed into sticks by the application of very little pressure. The members 41 and 42 are quite cold; in fact, they may be at a temperature of minus 20° F. Due to this low temperature and the low pressure required to form the warm gum the gum is formed into sticks or wafers without adhering to the members 41 and 42. The outer surface of the gum is cooled by the cold surfaces of the rolls 41 and 42 so that the wafers 88 will hold their shape until they are cooled by the air surrounding the apparatus. At the low temperature at which it issues from the machine disclosed, the gum may be readily broken up along the lines of division into separate sticks, this being done before the temperature of the gum has risen to room temperature.

The preferred form of my invention described herein in specific detail will suggest to those skilled in the art various substitutions, changes, and modifications that do not depart from my underlying concepts, and I reserve the right to all such departures that properly fall within the scope of my appended claims.

I claim as my invention:

1. In a machine for forming chewing gum, the combination of: cooperating forming means so connected and operated as to press the gum while hot into individual sticks; cooling means for artificially cooling the forming surfaces of said forming means to a temperature at which adhesion of said hot gum to said surfaces is prevented; enclosing means within which said forming means operates; and means for removing moisture from the air within said enclosing means for the purpose of preventing deposition of moisture on the surfaces of said forming means.

2. In a machine for forming chewing gum, the combination of: cooperating forming means to press the gum while hot into a series of interconnected sticks; cooling means for artificially cooling the forming surfaces of said forming means to a temperature at which adhesion of said hot gum to said surfaces is prevented; means to convey the formed gum from said forming means; means enclosing said forming means and at least a substantial portion of said conveying means; and refrigerating means acting upon the atmosphere in said enclosing means to condense moisture from the atmosphere and to cool to brittleness the gum on said conveying means.

3. In a machine for forming chewing gum, the combination of: walls providing a cooling chamber; cooling means for artifically cooling said chamber; cooperating forming means in said chamber adapted to press the gum while hot into individual sticks; means for delivering chewing gum to said forming means in a sufficiently heated condition to insure a high degree of plasticity in the gum; cooling means for artifically cooling the forming surfaces of said forming means to a temperature at which adhesion of said hot gum to said surfaces is prevented; and means for conveying said gum sticks through said chamber for a sufficient time period to permit the sticks to harden in the chamber.

4. In a mechanism for forming sticks from a plastic material, the combination of: two rollers, each roller having stick forming faces thereon, said faces being so formed that the faces on one roller cooperate with the faces on the other roller, the faces on each roller being connected by shoulders to form saw-shaped teeth; means for so adjusting the relative positions of the rollers that the distance between said forming faces can be controlled to vary the dimensions of the sticks; and means for so driving said rollers that the shoulders on one roller cooperate with the shoulders on the other roller to shear the material between the rollers.

5. In a mechanism for forming sticks from a plastic material, the combination of: two cooperating rollers, the periphery of each roller being notched to present stick forming faces, the notches on one roller forming one edge and one face of each stick, the notches on the other roller forming the opposite edge and the opposite face of each stick; means for driving said rollers synchronously; and means for adjusting the relative rotative positions of said rollers and thereby the relation of the stick forming faces of one roller to the stick forming faces of the other roller to vary the configuration of the formed material.

6. In a mechanism for forming sticks of a given configuration with substantially plane faces that are substantially parallel from a plastic material that reacts to deformation by both elastic stretch and plastic flow: cooperating forming means adapted to act upon the material with a rolling action to form the material into individual sticks, said forming means having opposed forming faces shaped and disposed to define successive molds of smaller cross-sectional configuration than said given configuration, the middle of each of said molds being smaller in cross section than the two ends of the mold to compensate for said stretch and flow whereby the material upon release from said forming means changes to approximately the desired configuration.

7. In a mechanism for forming sticks with substantially parallel and substantially plane faces from a plastic material that reacts to deformation by both elastic stretch and plastic flow: cooperating forming means adapted to act upon the material with a rolling action to form the material into individual sticks, said forming means having opposed pairs of forming faces defining successive molds, at least one face of each pair bulging sufficiently from circular configuration to force the material into a concave configuration in compensation for said stretch and flow whereby the material upon release from said forming means assumes a shape characterized by substantially parallel and substantially plane faces.

8. In a mechanism for forming sticks from a plastic material that reacts to deformation by both elastic stretch and plastic flow: a pair of rollers, the periphery of each roller being notched to present stick forming faces, the notches on one roller forming one edge and one face of each stick, the notches on the other roller forming the opposite edge and the opposite face of each stick, said stick forming faces of at least one of said rollers bulging sufficiently to force the material into a concave configuration in compensation for said stretch and flow whereby the material upon release from said forming means assumes a shape characterized by substantially parallel and substantially plane faces; and means for driving said rollers synchronously.

9. In a machine adapted to form sticks of chewing gum from a hot plastic mass of gum by pressing said gum while hot into the form of sticks, the combination of: two cooperating forming means adapted to act on the plastic material with a rolling action in a molding zone, said forming means having indented forming surfaces successively defining stick molds, the adjacent ends of said successive molds being offset relative to each other in overlapping relation and in communication with each other whereby the plastic is formed into a ribbon of successive sticks interconnected at overlapping margins; cooling means for artifically cooling said forming surfaces to a temperature at which the adhesion of said hot gum to said surfaces is prevented; and means to actuate said forming means.

10. In a machine adapted to form sticks from a plastic material: two cooperating rotary forming means adapted to act on the plastic material with a rolling action in a molding zone to form a ribbon of interconnected sticks, each of said forming means having peripheral indentations, the peripheral indentations of one of the forming means cooperating with the peripheral indentations of the other forming means to successively define stick molds, the adjacent ends of said successive molds being in offset and overlapping relation to each other whereby the space defined by each mold is in communication with the space defined by the succeeding mold.

11. In a machine for forming chewing gum, the combination of: two hollow cooperating rolls adapted by relative movement to mold the gum while hot into individual sticks; means to circulate refrigerant through said rolls for cooling the forming surfaces thereof to a temperature at which adhesion of said hot gum to said surfaces is prevented; and means for maintaining a dehydrated atmosphere around said rolls.

FRANK A. GARBUTT.